United States Patent [19]
Liethen

[11] Patent Number: 5,947,054
[45] Date of Patent: Sep. 7, 1999

[54] BEE GUARD FOR NECTAR FEEDER

[76] Inventor: Frederic J. Liethen, P.O. Box 296, Appleton, Wis. 54912

[21] Appl. No.: 09/065,246

[22] Filed: Apr. 23, 1998

[51] Int. Cl.$^6$ ............................. A01K 39/00; A01K 39/02
[52] U.S. Cl. ............................. 119/57.9; 119/52.3; 119/72
[58] Field of Search .................................. 119/57.9, 57.8, 119/72, 72.5, 75, 52.3, 52.2, 54, 55, 62

[56] References Cited

U.S. PATENT DOCUMENTS

| | | | |
|---|---|---|---|
| 1,062,610 | 5/1913 | Schisler | 119/55 |
| 1,343,093 | 6/1920 | Shoultz | 119/51.5 |
| 2,230,058 | 1/1941 | Hornung . | |
| 2,595,324 | 5/1952 | Baker | 119/55 |
| 2,944,517 | 7/1960 | Siggins | 119/55 |
| 2,965,070 | 12/1960 | Myrick | 119/57.9 |
| 2,997,981 | 8/1961 | Siggins | 119/55 |
| 3,503,372 | 3/1970 | Saurer | 119/55 |
| 4,541,362 | 9/1985 | Dehls . | |
| 5,255,631 | 10/1993 | Anderson | 119/52.2 |
| 5,269,258 | 12/1993 | Brown . | |

Primary Examiner—Michael J. Carone
Assistant Examiner—James S. Bergin
Attorney, Agent, or Firm—Andrus, Sceales, Starke & Sawall

[57] ABSTRACT

A selective nectar dispensing system for use with a bird feeder. The nectar dispensing system includes a pivot assembly which has a counterweight at one end and a feeding port restricting portion at another end. The pivot assembly is operable between a closed blocking position and an open feeding position. The counterweight normally biases the restricting portion to the closed blocking position and has a mass selected to both permit a feeding bird to move the restricting portion towards the open feeding position and to prevent movement of the restricting portion by an insect, thus providing selective access to the feeding port. The feeding port restricting portion is urged away from the feeding port against the force of the counterweight. Access to the feeding port is provided only when the feeding port restricting portion is urged away from the feeding port by the beak of a feeding bird in one embodiment and by the weight of the bird in another embodiment.

29 Claims, 4 Drawing Sheets

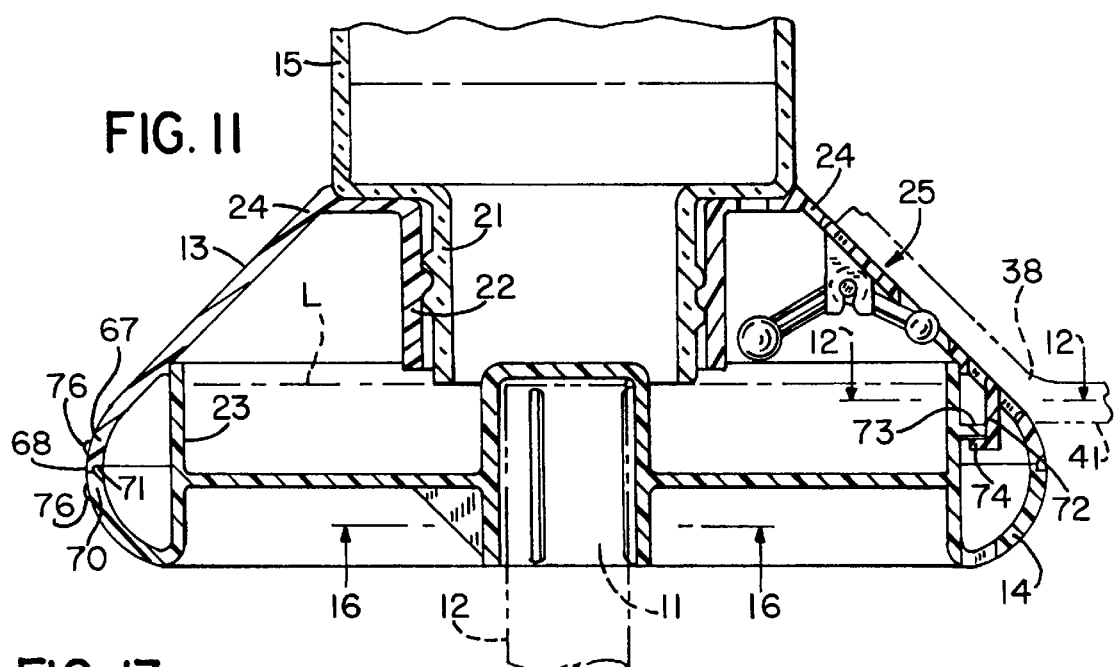
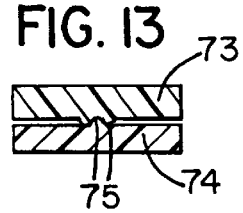
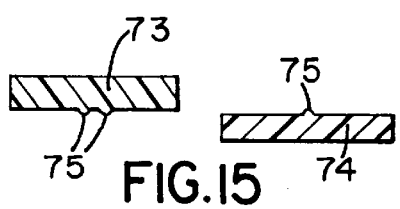
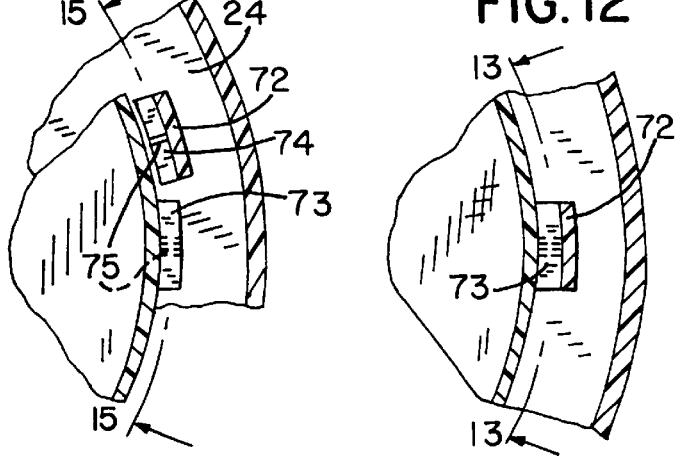
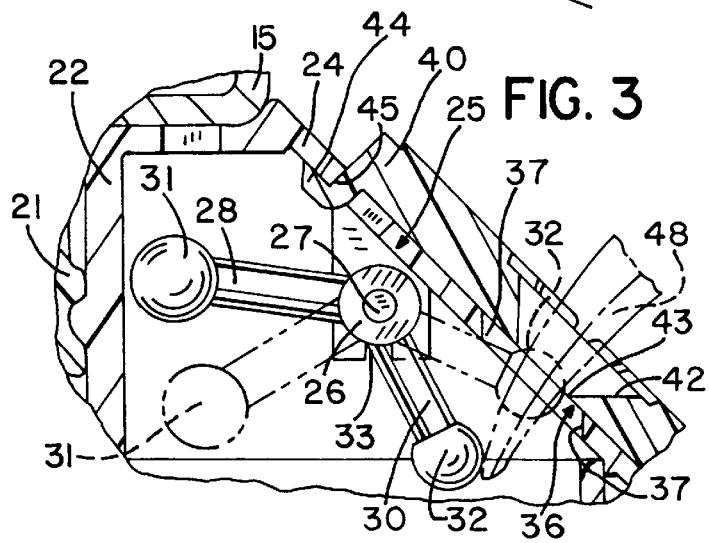

BEE GUARD FOR NECTAR FEEDER

FIELD OF THE INVENTION

The invention relates generally to bird feeders. In particular, the invention relates to a selective nectar dispensing system for use with a bird feeder.

BACKGROUND OF THE INVENTION

Bird feeders are often used to attract various species of birds. It is oftentimes desirable to provide food only for one or more specific birds of interest. One way to attract a certain type of bird is to supply the bird feeder with the particular type of food the bird enjoys. For example, it is well known that certain birds, such as hummingbirds and orioles, prefer a nectar or nectar-type sweet liquid when feeding.

Prior art bird feeders have sought to prevent access from unwanted heavier birds and rodents such as squirrels. For example, Hornung U.S. Pat. No. 2,230,058 discloses a bird feeder designed for lighter birds. The weight of a heavier bird will lower a feeding platform to a tilted position, thus blocking the seed ports. Additionally, Dehls U.S. Pat. No 4,541,362 discloses a squirrel proof selective bird feeder which utilizes the weight of a squirrel to close off the feeding source by spring actuated means.

Although they target lighter birds, these prior art bird feeders are intended to eliminate heavier birds and rodents from feeding at the bird feeder. However, when the food source is a nectar or sweetened liquid, the biggest problem does not necessarily come from seed feeding birds. The problem often relates to insects, and in particular bees or wasps, which are also attracted to the nectar within the bird feeder. A particularly serious problem is the propensity for bees and other insects to enter and become trapped in the nectar feeder. The insects enter through the feeding ports and are unable to exit once inside the nectar reservoir. The aggregation of bees and other insects is a health hazard for birds, unsightly and a nuisance and, further, may plug or block the feeding ports to a point where it is prohibitive for birds to be able to feed on the nectar.

Brown U.S. Pat. No. 5,269,258 discloses a hummingbird and butterfly feeder which is designed to prevent bees from getting inside. However, certain birds such as orioles which also feed on nectar, lack the long proboscis that the hummingbirds have. The orioles require closer access to the actual nectar and larger feed port openings to get their larger beak into a feeder and in a position to feed. Therefore, bird feeders designed specifically for hummingbirds are problematic in that they tend to exclude large beaked birds.

BRIEF SUMMARY OF THE INVENTION

The present invention advantageously provides a bird feeder which selectively dispenses nectar and allows such birds as orioles to feed without allowing insects to have access to the nectar within the bird feeder. The feeder may be constructed to also permit hummingbirds to feed.

In one aspect of the invention, a selective nectar dispensing system for use with a bird feeder is provided. The bird feeder includes a base defining an interior side, a nectar reservoir, and at least one feeding port. The nectar dispensing system comprises a pivot assembly which is pivotally mounted to the interior side of the base. The pivot assembly has at one end a counterweight and at a second end a feeding port restriction portion. The pivot assembly is operable between a closed blocking position and an open feeding position. The counterweight normally biases the restricting portion to the closed blocking position. The counterweight has a mass selected to both permit a feeding bird to move the restricting portion towards the open feeding position, and to prevent movement of the restricting portion by an insect. The counterweight is connected to the feeding port restricting portion by a joint having a pair of arms extending therefrom. Each arm is integral with the joint and forms a fixed angle therebetween. One arm terminates at the counterweight and the other arm terminates at the feeding port restricting portion. Preferably, the counterweight provides an overbalance mass of approximately one gram and the pivot assembly arms are of a substantially equal length, and are selected such that the counterweight arm including the counterweight weighs one gram in excess of the weight of the feeding port restricting portion arm. The joint further includes mounting members extending therefrom and is attachably mounted to the interior of the base such that the mounting members pivot when the feeding port restricting portion is moved, as by a bird. The fixed angle between the arms extending from the joint is preferably greater than 90° but less than 180°.

In another aspect of the invention, the feeding port restricting portion is shaped to substantially fit within the feeding port in its closed blocking position, but without contacting the peripheral edge of the port. Preferably, the feeding port restricting portion has a spherical shape selected to facilitate the dropping of nectar from the feeding port restricting portion. The nectar dispensing system includes a joint member which is mounted to at least one pivot mount member located at the interior side of the base such that the joint member can be removably inserted into the pivot mount member. The joint member further includes a pin extending horizontally therethrough where the joint member is permitted to pivot with respect to the pin when inserted into the pivot mount member.

In yet another aspect of the invention, a bird feeder is provided which comprises a base defining an interior and exterior sides and having at least one feeding port, a nectar reservoir removably connected to the base, and a pivot assembly. The bird feeder further includes a bird support surface connected to the base. The bird support surface further includes a bird attracting portion which is removably attached to the base. The bird attracting portion has an aperture which provides access to the feeding port. The bird attracting portion is integrally formed with the bird support surface. The bird attracting portion includes mounting tab members for insertion into slots located in the base. Preferably, the bird attracting portion is a simulated citrus flower or the like representative, for example, of an orange blossom for attracting orioles.

The present invention also contemplates a method of selectively providing access to a bird feeder in accordance with the aforementioned aspects of the invention.

Various other features, objects, and advantages of the invention will be made apparent from the following detailed description and the drawings.

BRIEF DESCRIPTION OF THE DRAWINGS

FIG. 3 is a further enlarged detail of FIG. 2 showing operation of the selective dispensing device of the preferred embodiment.

FIG. 11 is a vertical sectional detail taken through the center of the feeder of FIG. 1.

FIGS. 12–15 are sectional details of the locking tab arrangement shown in FIGS. 2, 7, 8 and 11.

FIG. 16 is a horizontal sectional detail taken on line 16—16 of FIG. 11.

DETAILED DESCRIPTION OF THE PREFERRED EMBODIMENTS

Figure 1:
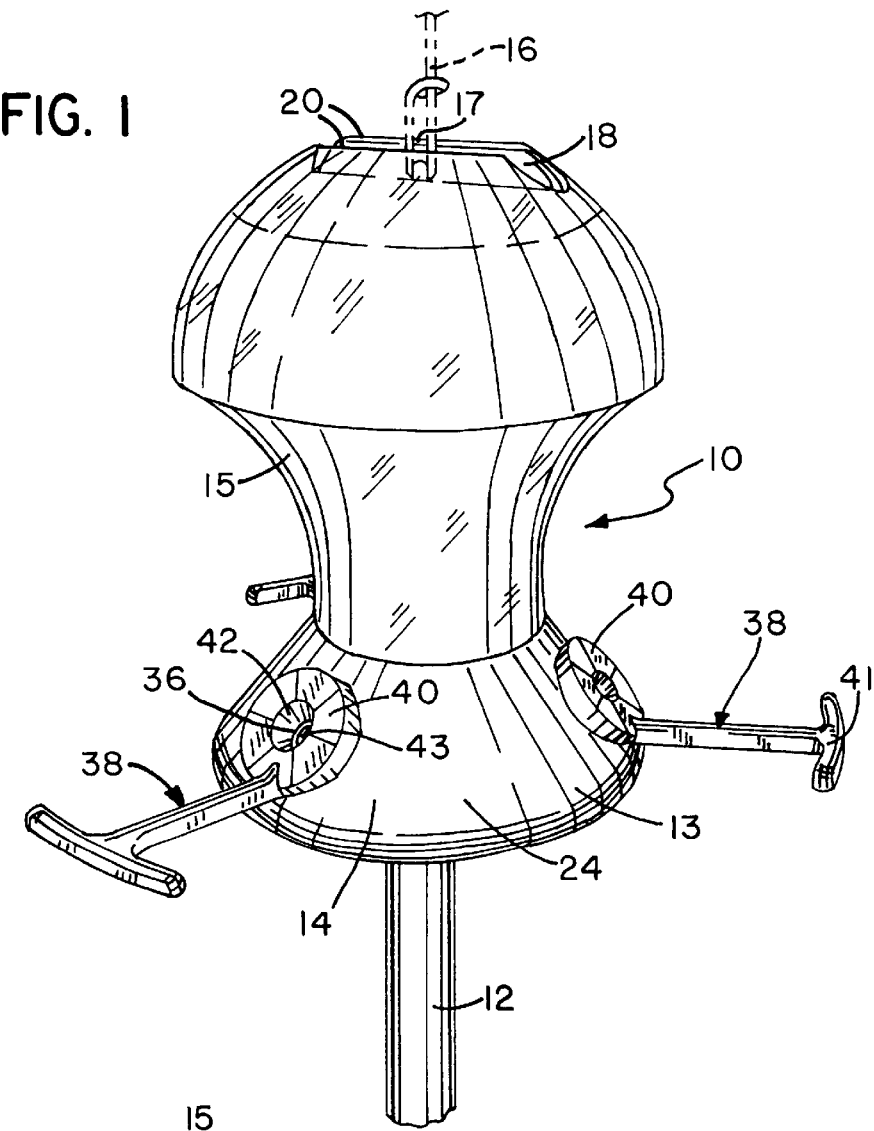
FIG. 1 is a perspective view of the presently preferred embodiment of a nectar feeder incorporating the subject invention.

The presently preferred embodiment of the nectar feeder 10 including the selective dispensing system of the present invention is shown in perspective in FIG. 1. As shown in FIG. 1 and in FIG. 11, the feeder 10 is shown mounted on the upper end 11 of a vertical post 12. The feeder 10 includes a lower base 13, enclosed at the bottom by a demountable nectar holding chamber 14 and at the top by a demountable nectar supply reservoir 15. The feeder 10 is preferably of all molded plastic construction and, as is well known in the art, the supply reservoir 15 is typically transparent to provide an additional attractant to feeding birds and to provide an indication of the level of nectar in the upper supply reservoir 15. Alternate mounting of the feeder 10 may be provided by suspending the feeder from a wire 16 attached to a mounting flange 17 seated in a grooved recess 18 in the top of the supply reservoir. The top of the reservoir 15 is preferably provided with flat surfaces 20, defining the edges of the recess 18, so the reservoir 15 may be free standing when inverted to facilitate filling with nectar. As may be best seen in FIG. 11, the lower end of the supply reservoir 15 has an externally threaded neck 21 which is adapted to threadably engaged an internally threaded sleeve 22 centered in the top of the base 13. Inside the base 13, the holding chamber 14 defines a shallow cylindrical dish 23 into which the nectar flows and is held when the feeder is inverted such that the nectar is held in the dish at a level generally indicated by the line L in FIG. 11.

Referring also to FIGS. 2–5 the selective nectar dispensing system of the present invention is intended to permit nectar-feeding birds such as orioles (and in the alternate embodiment hummingbirds as well) to feed, but blocking ingress to the interior of the base and holding chamber dish 23 by insects. The main outer wall 24 of the base 13 is generally frustoconical and, on the interior of the base wall 24 is mounted a pivot assembly 25. The pivot assembly 25 includes a central hub 26 to which are integrally attached oppositely extending axially aligned stub shafts 27. Extending integrally and generally radially from the hub 26 are a counterweight arm 28 and a feeding port closing arm 30. The opposite end of the counterweight arm 28 is provided with an integral counterweight 31 and the opposite end of the closing arm 30 is provided with an integral spherical restricting portion 32. The stub shafts 27 are adapted to be snapped into downwardly opening slots 33 in a pair of mounting flanges 34 extending downwardly from the inside of the outer base wall 24. The upper ends of the slots 33 are provided with cylindrical bearing surfaces 35 which allow the stub shafts 27 to rotate freely therein.

Figure 2:
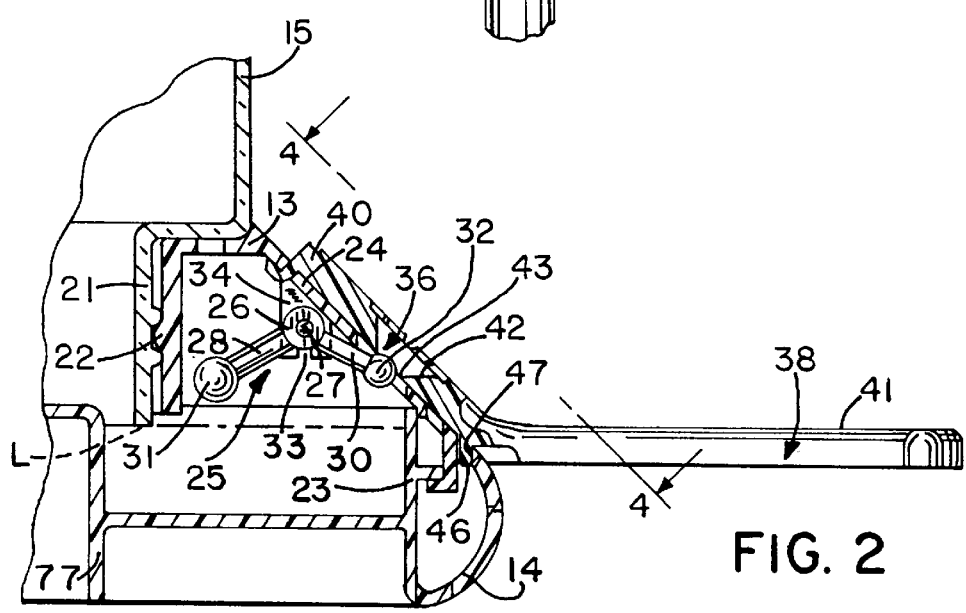
FIG. 2 is an enlarged vertical section detail through one of the feeding ports of the feeder shown in FIG. 1.
Figure 4:
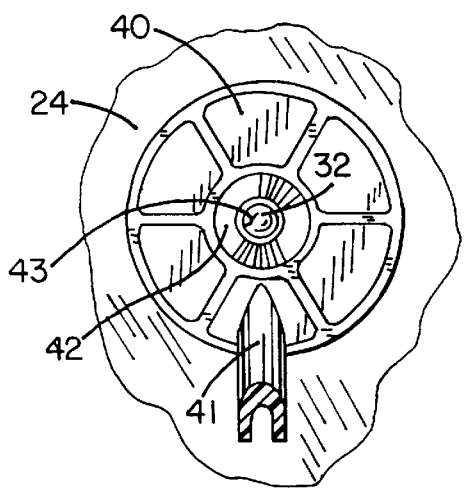
FIG. 4 is an angular elevation detail of the feeding port taken on line 4—4 of FIG. 2.

Just below and aligned with the mounting flanges 34, the outer wall 24 is provided with a feeding port 36. In the embodiment shown in FIG. 1, the base 13 is provided with three feeding ports 36. In the normal at rest position, the pivot assembly 25, as best seen in FIGS. 2 and 3, is biased rotationally in a counterclockwise direction by the counterweight 31. The spherical restricting portion 32 on the end of arm 30 enters and substantially closes the feeding port 36. However, the spherical portion 32 does not contact the peripheral edge 37 of the feeding port, but instead, the closing arm 30 contacts the edge 37 to provide a rotational stop for the pivot assembly. In this manner, any liquid nectar which is picked up by the spherical end portion 32, will tend to run down and drop back into the nectar dish 23.

A bird perch 38 is attached to the outer wall 24 of the base 13. The perch includes an attachment base 40 and an integral T-shaped perching bar extending generally horizontally from the lower edge of the base 40. The attachment base 40 is generally circular in shape and is preferably designed to simulate a citrus flower, such as a blossom which is known to attract orioles. The center of the attachment base 40 has a conical depression 42 which defines a central access opening 43 which is aligned with the feeding port 36 when the perch is attached to the base. Attachment is facilitated by providing the upper edge of the attachment base 40 with an attachment lip 44 adapted to hook into a rectangular opening 45 in the base wall 24, and a lower spade-like tab 46 adapted to snap into a lower rectangular opening 47 in the base wall 24.

As best seen in FIG. 2, with the counterweight 31 holding the opposite spherical portion 32 in the feeding port blocking position (shown in dashed lines), the feeding port 36 is substantially closed but the spherical closing portion 32 does not contact the peripheral edge 37 of the port. A nectar feeding bird, such as an oriole, attracted to the perch 38 inserts its beak 48 through the access opening 43, pushes the spherical portion 32 rotationally out of the way, allowing the beak to continue through the feeding port 36 to reach the nectar (as shown in the full line position). When the beak 48 is retracted, the counterweight 31 causes the pivot assembly 25 to return to the blocking position, and any nectar which has accumulated on the spherical end portion 32 will run downwardly and drop back into the nectar reservoir dish 23.

The entire integral pivot assembly 25 is preferably molded of plastic and the arms 28 and 30, counterweight 31 and restricting portion 32 are selected to provide a counterweight overbalance of mass of approximately 1 gram. The 1 gram overbalance has been found sufficient to prevent as many as three marauding bees from moving spherical end portion 32 against the force of the counterweight. Further, spherical end portion 32 fits closely enough within the peripheral edge 37 of the feeding port 36 to prevent smaller insects, such as ants, from entering the reservoir. To accommodate the rotational movement just described, the pivot assembly arms 28 and 30 are mounted at an angle between 90° and 180°. The stop which is provided by engagement of the closing arm 30 with the peripheral edge 37 of the feeding port, in addition to positioning the restricting portion 32 in the feeding port, also prevents the counterweight from rotating downwardly into the nectar.

Figure 5:
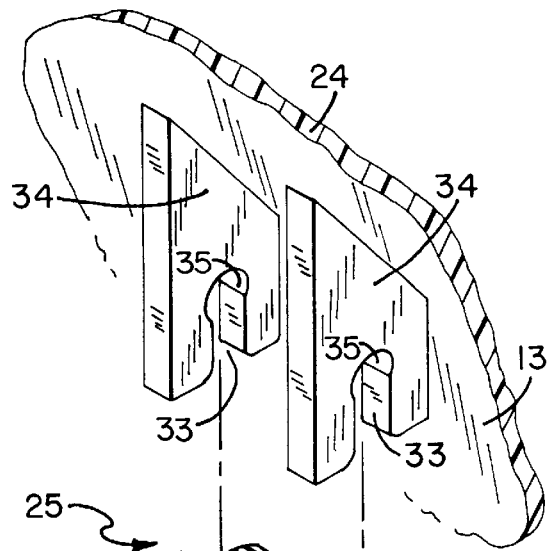
FIGS. 5 and 6 are perspective details of two embodiments of the pivot mounting assembly for the nectar dispensing system.
Figure 6:
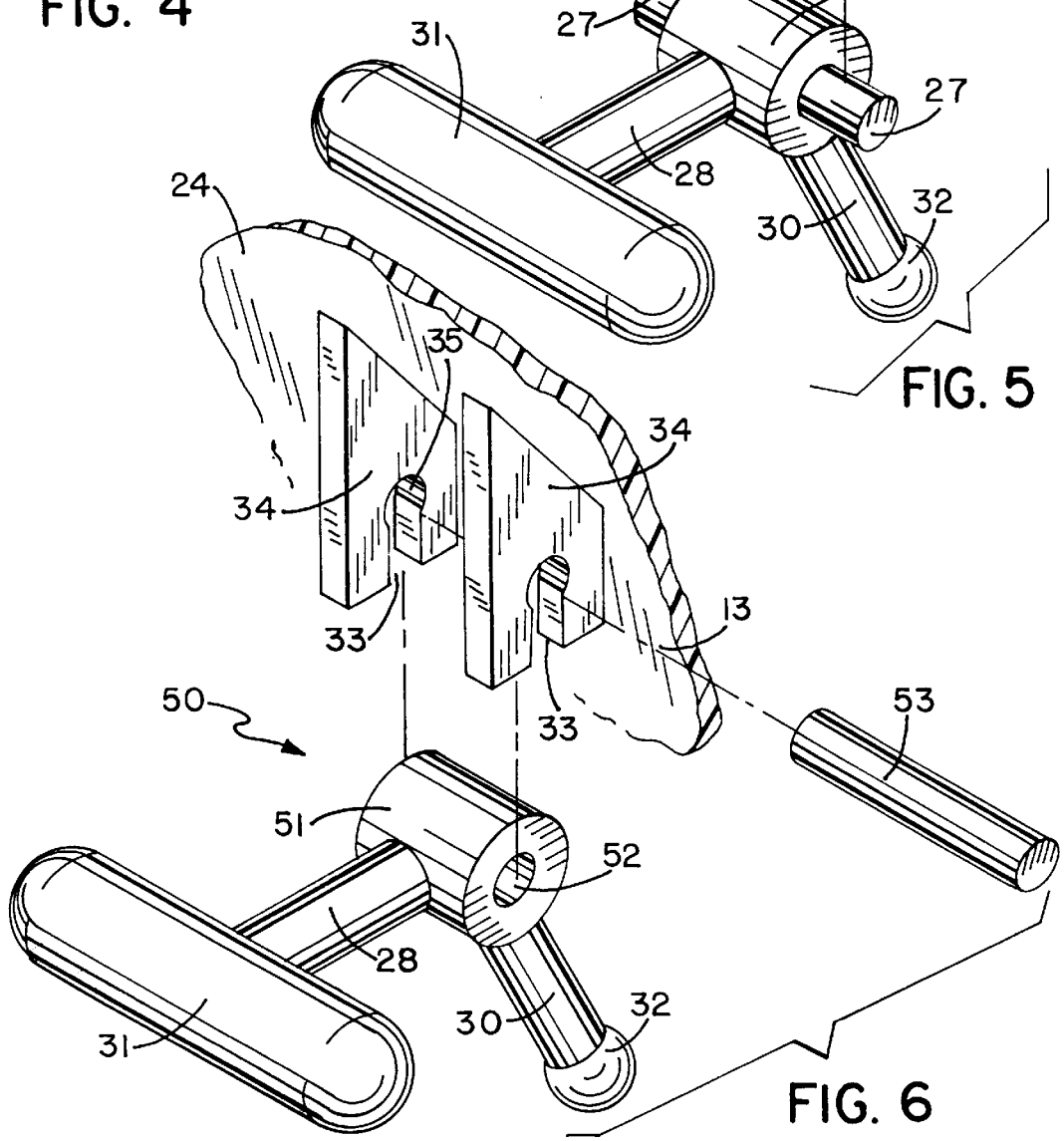

The alternate embodiment of the pivot assembly 50 shown in FIG. 6, is constructed substantially identically to the preferred FIG. 5 embodiment, except that the central hub 51 is provided with a through bore 52 to accept a single pivot shaft 53. The pivot shaft 53 may be made of plastic or metal, but is otherwise mounted in the slotted mounting flanges 34 in the same manner previously described.

Figure 7:
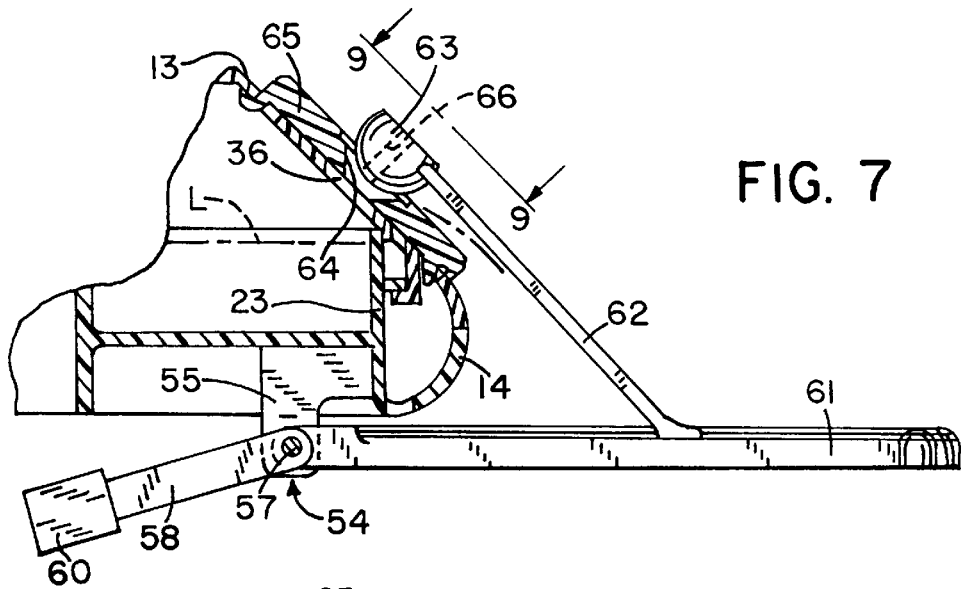
FIG. 7 is an enlarged sectional detail similar to FIG. 2 showing an alternate embodiment of the invention in the closed blocking position.

Referring now to FIGS. 7–10 selective access to the feeder 10 is provided by an alternate pivot assembly 54 which is attached to the outside of the feeder. In this embodiment, the lower holding chamber 14 which encloses the base 13 (in a manner which will be described in greater detail below) is provided with a pair of downwardly depending mounting flanges 55 to which the pivot assembly 54 is attached. The pivot assembly includes a hub 56 which carries a pivot shaft 57 rotationally supported at its ends in the mounting flanges 55. A counterweight arm 58, carrying a counterweight 60 extends radially inwardly of the feeder base and, in the closed blocking position, at a slight downward angle as shown in FIG. 7. A perch arm 61 extends generally horizontally in the opposite direction from the pivot shaft 57 and is generally T-shaped as is the perch bar 41 of the previously described embodiment. An integral closing arm 62 extends at an angle back toward the feeder from approximately the center of the perch arm 61. The free end of the closing arm is provided with a semi spherical closure 63 which, in the at rest position of FIG. 7, is positioned in the conical depression 64 in the center of the attractor base 65. The base 65 may be identical to the attachment base 40 of the previously described embodiment and may be demountably attached to the outer wall 24 of the base in the same manner. As shown in FIG. 7, the rigid, closing arm 62 positions the spherical closure 63 within the conical depression 64, but without touching the walls thereof. This prevents the closure from becoming stuck in the depression with nectar deposited by feeding birds. However, the small annular space between the depression and the outside of the spherical closure is small enough to prevent the ingress of insects as small as ants.

Figure 8:
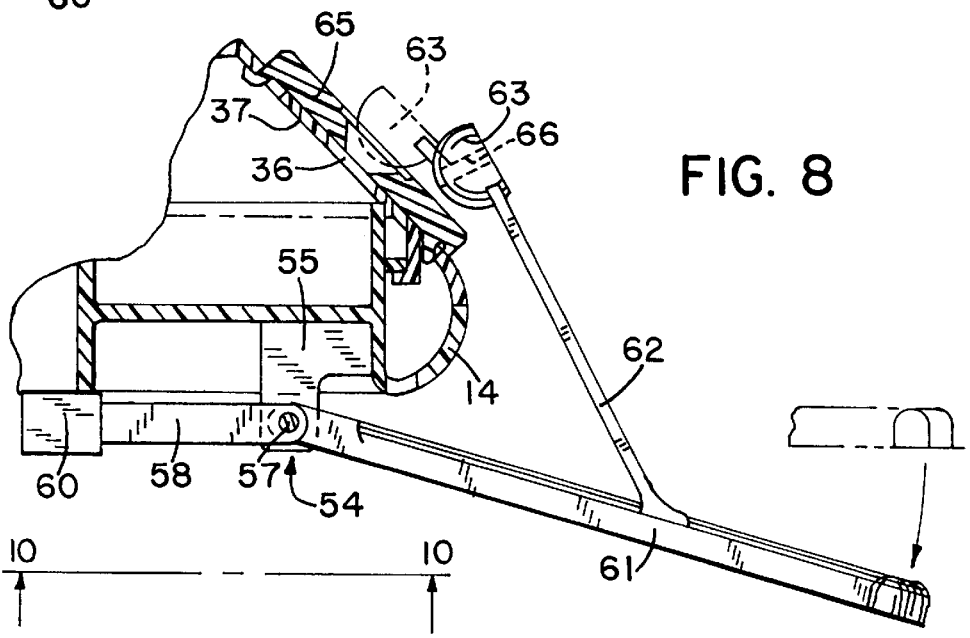
FIG. 8 is a detail similar to FIG. 7 showing the nectar dispensing system in the open feeding position.
Figures 9, 10:
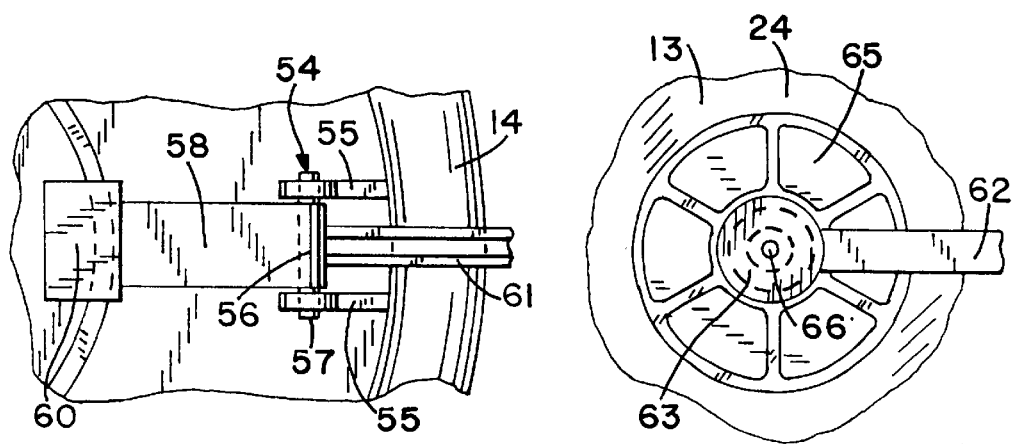
FIG. 9 is an angular elevation detail of the feed port taken on line 9—9 of FIG. 7.
FIG. 10 is a bottom plan detail of a portion of the pivot assembly taken on line 10—10 of FIG. 8.

Referring to FIG. 8, the counterweight 60 and the lengths of arms 58 and 61 are chosen such that a nectar-feeding bird, such as an oriole, landing on the end of the perch arm 61 will cause the same to pivot downwardly, carrying the closing arm and spherical closure 63 therewith. The rotational movement of the closing arm and spherical closure are such that contact is not made with any part of the attachment base 40.

Because hummingbirds are not heavy enough to cause the necessary pivotal movement of the pivot assembly 54, the spherical closure 63 may be provided with a small central feed hole 66 through which the beak and tongue of a hummingbird may be extended when the assembly is in the closed position of FIG. 7. Thus, large and small nectar-feeding birds may utilize the selective dispensing system of this embodiment, while the feeder remains protected against ingress of all insects of concern.

As indicated above, the lower holding chamber 14 portion of the feeder 10 is demountably attached to the lower edge of the base 13. The lower edge of the base includes a circular peripheral lower rim 67 which includes an outwardly offset lip 68. The holding chamber 14 includes a circular peripheral upper rim 70 which terminates in an inwardly offset lip 71. The lip 68 and 71 interfit with a friction fit which is normally sufficient to hold the base 13 and holding chamber 14 together. However, to provide a more secure attachment, the inside of the outer wall 24 of the base, just below each of the feeding ports 36, is provided with downwardly depending L-shaped locking tabs 72. In similar locations around the outer wall of the cylindrical dish portion 23 of the holding chamber, integral locking tabs 73 extend radially outwardly. With the locking tabs 72 and 73 offset rotationally from each other, the rims 67 and 70 of the base and holding chamber, respectively, may be pressed together and, with subsequent relative rotation between the respective rims, the locking tabs 73 are caused to override the horizontal lips 74 of the locking tabs 72, thereby preventing separation of the lower holding chamber from the base. Preferably, the locking tabs 73 and respective engaging horizontal lips 74 are provided with rib-like detents 75 to secure the tabs in a locked position. Conveniently, the outside surfaces of the base 13 and the holding chamber 14 immediately adjacent their respective interengaging rims 67 and 70 may be provided with alignment indicators 76 to indicate when the tabs are in the locked position. Conversely, the alignment indicators 76 are offset rotationally from one another when the interengaging rims are first brought together for connection.

Referring to FIGS. 11 and 16, the center of the underside of the holding chamber 14 is provided with a downwardly opening blind sleeve 77 for receipt of the upper end 11 of the mounting post 12. The walls of the sleeve 77 may be provided with axially extending ribs 78 to facilitate insertion of the post. It has been found that the previously described locking tabs 72 and 73 are particularly useful in holding the base and holding chamber of the feeder together when post-mounted in windy conditions.

It is recognized that other equivalents, alternatives, and modifications aside from those expressly stated, are possible and within the scope of the appended claims.

I claim:

1. A selective nectar dispensing system for use with a bird feeder having a base defining an interior side, a nectar reservoir, and at least one feeding port, the nectar dispensing system comprising:

a pivot assembly pivotally mounted to the base having at one end a counterweight and at a second end a feeding port restricting portion operable between a closed blocking position and an open feeding position, the counterweight normally biasing the restricting portion to the closed blocking position and having a mass selected to both permit a feeding bird to move the restricting portion towards the open feeding position and to prevent movement of the restricting portion by an insect, wherein the pivot assembly includes a joint having a pair of arms extending therefrom, each arm being integral with the joint and defining a fixed angle therebetween, with one arm terminating at the counterweight and the other arm terminating at the feeding port restricting portion.

2. The selective nectar dispensing system of claim 1, wherein the pivot assembly is mounted to the interior side of the base.

3. The selective nectar dispensing system of claim 2, wherein the pivot assembly arms are selected to provide the counterweight arm with an overbalance mass of approximately one gram.

4. The apparatus of claim 2 wherein the counterbalance arm has an overbalance mass selected to permit the restricting position to be moved to the open feeding portion by the beak of a bird.

5. The selective nectar dispensing system of claim 1, wherein the joint further includes pivot members extending therefrom and attachably mounted to the interior of the base to permit the assembly to pivot when the feeding port restricting portion is moved.

6. The selective nectar dispensing system of claim 1, wherein the fixed angle between the arms extending from the joint is in the range of about 90° to 180°.

7. The selective nectar dispensing system of claim 6, wherein the fixed angle between the arms extending from the joint is an obtuse angle which is in the range of about 90° to 180°.

8. The apparatus of claim 1 wherein the at least one feeding port is defined by a peripheral edge and the restricting portion is positioned at a selected closely spaced distance from said edge in the closed blocking position.

9. The apparatus of claim 1 wherein the pivot assembly is mounted on the outside of the base and said other arm includes a perch for a feeding bird.

10. The apparatus of claim 9 wherein the counterweight on said one arm has an overbalance mass selected to permit the restricting portion to be moved to the open feeding position by the weight of a bird on the perch.

11. A selective nectar dispensing system for use with a bird feeder having a base defining an interior side and an exterior side, a nectar reservoir, and at least one feeding port, the nectar dispensing system comprising:
   a pivot assembly comprising a joint pivotally mounted to the interior side of the base and operable between a closed blocking position and an open feeding position;
   the pivot assembly including a feeding port restricting portion having a first arm extending therefrom to said joint, the feeding port restricting portion shaped to substantially fit within the at least one feeding port;
   a counterweight having a mass selected to both permit a feeding bird to move the restricting portion towards the open feeding position and to prevent movement of the restricting portion by an insect, the counterweight normally biasing the feeding port restricting portion to the closed blocking position and including a second arm extending therefrom to said joint.

12. The selective nectar dispensing system of claim 11, wherein the counterweight has an overbalance mass of approximately one gram.

13. The selective nectar dispensing system of claim 11, wherein the joint, feeding port restricting portion and the counterweight are integrally formed into a single piece.

14. The selective nectar dispensing system of claim 11, wherein the feeding port restricting portion has a spherical shape selected to facilitate beading and dropping of nectar away from the feeding port restricting portion.

15. The selective nectar dispensing system of claim 11, wherein the joint member is mounted to a pivot mount member depending from the interior side of the base such that the joint member can be removably inserted into the pivot mount member.

16. The selective nectar dispensing system of claim 15, wherein the joint member includes an integral pivot pin, whereby the joint member is permitted to pivot with the pin when inserted into the pivot mount member.

17. A bird feeder comprising:
   a base defining an interior side and an exterior side and having at least one feeding port;
   a nectar reservoir removably connected to the base;
   a pivot assembly pivotally mounted to the interior side of the base having at one end a counterweight and at a second end a feeding port restricting portion operable between a closed blocking position and an open feeding position, the counterweight normally biasing the restricting portion to the closed blocking position and having a mass selected to both permit a feeding bird to move the restricting portion towards the open feeding position and to prevent movement of the restricting portion by an insect, thus providing selective access to the feeding port.

18. The bird feeder of claim 17 further including a bird perch surface connected to the base.

19. The bird feeder of claim 18 wherein the bird perch surface further includes a bird attracting portion removably attached to the base over the at least one feeding port, the bird attracting portion having an aperture providing access to the at least one feeding port.

20. The bird feeder of claim 19 wherein the bird attracting portion is integrally formed with the bird perch surface and wherein the base further includes a plurality of slots and the bird attracting portion includes tab members for insertion into the slots of the base.

21. The bird feeder of claim 20 wherein the bird attracting portion is a simulated citrus flower segment.

22. The bird feeder of claim 21 wherein the simulated citrus flower segment is representative of an orange blossom for attracting orioles.

23. The bird feeder of claim 17 wherein the counter weight has an overbalance mass of approximately one gram.

24. The apparatus of claim 17 wherein the reservoir includes a lower nectar holding chamber demountably attached to a lower edge of the base.

25. The apparatus of claim 24 wherein the lower edge of the base includes a circular peripheral lower rim, and an upper edge of the holding chamber includes a circular peripheral upper rim adapted to interfit with said lower rim to close the base.

26. The apparatus of claim 25 including locking tabs on the inside of said base and said holding chamber, said tabs adapted to engage in response to interfitting closure and relative rotation on the axis of the circular rims of said base and said chamber.

27. The apparatus of claim 26 including detent means on opposing faces of said locking tabs for holding said circular rims of said base and chamber in a locked position.

28. The apparatus of claim 24 wherein the center of said holding chamber includes a downwardly opening blind sleeve for receipt of the upper end of a mounting pole.

29. A method of providing selective access to a bird feeder comprising the steps of:
   providing a bird feeder having at least one feeding port;
   mounting a pivot assembly to the bird feeder, the pivot assembly operable between a closed blocking position and an open feeding position, and, having at one end a counterweight and having at a second end a feeding port restricting portion proximate to the at least one feeding port when the pivot assembly is in its closed blocking position;
   providing said pivot assembly with a pivot joint including a pair of arms extending in opposite directions from said pivot joint, each arm being integral with said pivot joint, one of said pairs of arms terminating at the counterweight and the other of said pair of arms terminating at said feeding port restricting portion; and,
   providing bird-operable and insect-inoperable means for pivoting the pivot assembly from its closed blocking position towards its open feeding position when the feeding port restricting portion is urged away from the at least one feeding port against the force of the counterweight, and wherein access to the at least one feeding port is provided only when the feeding port restricting portion is urged away from the at least one feeding port.

* * * * *